(12) United States Patent
Hiertz et al.

(10) Patent No.: US 9,967,233 B2
(45) Date of Patent: May 8, 2018

(54) WIRELESS LOCAL AREA NETWORK ACCESS POINTS

(71) Applicant: Telefonaktiebolaget L M Ericsson (publ), Stockholm (SE)

(72) Inventors: Guido Hiertz, Aachen (DE); Christofer Lindheimer, Linköping (SE); Stephen Rayment, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 175 days.

(21) Appl. No.: 14/427,782

(22) PCT Filed: Jan. 21, 2015

(86) PCT No.: PCT/SE2015/050055
§ 371 (c)(1),
(2) Date: Mar. 12, 2015

(87) PCT Pub. No.: WO2016/118056
PCT Pub. Date: Jul. 28, 2016

(65) Prior Publication Data
US 2016/0212745 A1     Jul. 21, 2016

(51) Int. Cl.
*H04W 4/00* (2009.01)
*H04L 29/12* (2006.01)
(Continued)

(52) U.S. Cl.
CPC ......... *H04L 61/6022* (2013.01); *H04W 16/32* (2013.01); *H04W 28/08* (2013.01);
(Continued)

(58) Field of Classification Search
None
See application file for complete search history.

(56) References Cited

U.S. PATENT DOCUMENTS 7,664,111 B2 *  2/2010  Tsubota ................. H04L 45/00
                                                     370/392
7,843,819 B1    11/2010  Benveniste
(Continued)

FOREIGN PATENT DOCUMENTS

EP     2696530 A2     2/2014
WO  2013143051 A1    10/2013

OTHER PUBLICATIONS

Unknown, Author, "Part 11: Wireless LAN Medium Access Control (MAC) and Physical Layer (PHY) Specifications, Amendment 9: Interworking with External Networks", IEEE Standard for Information Technology—Telecommunications and Information Exchange Between Systems—Local and Metropolitan Area Networks—Specific Requirements, IEEE Computer Society, IEEE Std 802.11u™—2011, Feb. 25, 2011, 1-208.

(Continued)

*Primary Examiner* — Phirin Sam
(74) *Attorney, Agent, or Firm* — Murphy, Bilak & Homiller, PLLC

(57) ABSTRACT

A method of operation of a network of WLAN access points comprises establishing a first WLAN access point ($AP_a$) having a first coverage area; and establishing a plurality of second WLAN access points ($AP_1, \ldots, AP_7$) having respective second coverage areas, such that the second access points provide traffic connections for at least one communications device in at least one of the respective second coverage areas; wherein the first coverage area overlaps the plurality of second coverage areas, and wherein the first WLAN access point provides control information for the at least one communications device.

17 Claims, 8 Drawing Sheets

(51) Int. Cl.
*H04W 16/32* (2009.01)
*H04W 84/12* (2009.01)
*H04W 88/08* (2009.01)
*H04W 28/08* (2009.01)
*H04W 36/00* (2009.01)

(52) U.S. Cl.
CPC ........ *H04W 36/0061* (2013.01); *H04W 84/12* (2013.01); *H04W 88/08* (2013.01)

(56) References Cited

U.S. PATENT DOCUMENTS

| | | | |
|---|---|---|---|
| 9,107,229 B2* | 8/2015 | Choudhury | H04W 72/0446 |
| 2006/0025148 A1* | 2/2006 | Karaoguz | H04H 20/57 |
| | | | 455/452.2 |
| 2007/0037603 A1 | 2/2007 | Dravida et al. | |
| 2008/0013522 A1* | 1/2008 | Benveniste | H04W 74/02 |
| | | | 370/350 |
| 2008/0031212 A1* | 2/2008 | Ogura | H04W 28/16 |
| | | | 370/338 |
| 2010/0054237 A1* | 3/2010 | Han | H04J 3/0638 |
| | | | 370/350 |
| 2013/0010719 A1 | 1/2013 | Shapira | |
| 2013/0077554 A1 | 3/2013 | Gauvreau et al. | |
| 2013/0156016 A1* | 6/2013 | Debnath | H04W 72/0406 |
| | | | 370/336 |
| 2013/0188571 A1* | 7/2013 | Cheong | H04W 72/0453 |
| | | | 370/329 |
| 2013/0195073 A1 | 8/2013 | Chen et al. | |
| 2013/0203036 A1* | 8/2013 | Jabara | H04L 67/10 |
| | | | 434/350 |
| 2013/0273913 A1* | 10/2013 | Swaminathan | H04W 48/16 |
| | | | 455/434 |
| 2014/0050127 A1* | 2/2014 | Wang | H04B 7/0456 |
| | | | 370/280 |
| 2014/0078950 A1 | 3/2014 | Jung et al. | |
| 2014/0198705 A1* | 7/2014 | Porat | H04L 1/04 |
| | | | 370/312 |
| 2014/0376515 A1* | 12/2014 | Lei | H04W 36/0061 |
| | | | 370/331 |
| 2015/0016414 A1* | 1/2015 | Hwang | H04W 36/0055 |
| | | | 370/331 |
| 2015/0078353 A1* | 3/2015 | Zhang | H04W 28/0236 |
| | | | 370/336 |
| 2015/0094065 A1* | 4/2015 | Su | H04W 36/30 |
| | | | 455/436 |
| 2015/0148045 A1* | 5/2015 | Olvera-Hernandez | H04W 36/32 |
| | | | 455/437 |
| 2015/0229533 A1* | 8/2015 | Vida | H04L 67/306 |
| | | | 715/736 |
| 2016/0142308 A1* | 5/2016 | Gage | H04L 47/18 |
| | | | 370/392 |
| 2016/0174111 A1* | 6/2016 | Zhu | H04W 36/0033 |
| | | | 370/331 |

OTHER PUBLICATIONS

Lee, Sung-Won et al., "802.11 TGs MAC Enhancement Proposal", Samsung, IEEE P802.11 Wireless LANs, IEEE 802.11-05/589r0, Jun. 15, 2005, 1-10.

Taori, Rakesh et al., "802.11 TGs MAC Enhancement Proposal", Samsung, IEEE 802.11-05/0608r1, Jul. 19, 2005, 1-36.

Unknown, Author, "Marketing Requirements Document for Interoperability Testing of Multiband Operations", Wi-Fi Alliance Multiband Operations Marketing Task Group, Version 1.00, 2014, 1-23.

Unknown, Author, "Part 11: Wireless LAN Medium Access Control (MAC) and Physical Layer (PHY) Specifications, Amendment 3: Enhancements for Very High Throughput in the 60 GHz Band", IEEE Computer Society, IEEE Standard for Information Technology—Telecommunications and Information Exchange Between Systems Local and Metropolitan Area Networks—Specific Requirements, Dec. 28, 2012, 1-628.

* cited by examiner

WIRELESS LOCAL AREA NETWORK ACCESS POINTS

This invention relates to Wireless Local Area Networks, and in particular to the use of a network of Wireless Local Area Network access points for providing service to communication devices.

BACKGROUND

The Wireless Local Area Network (WLAN) technology known as "Wi-Fi" has been standardized by IEEE in the 802.11 series of specifications (i.e., as "IEEE Standard for Information technology—Telecommunications and information exchange between systems. Local and metropolitan area networks—Specific requirements. Part 11: Wireless LAN Medium Access Control (MAC) and Physical Layer (PHY) Specifications"). As currently specified, Wi-Fi systems are primarily operated in the 2.4 GHz or 5 GHz bands. However, many other frequency bands are available. Despite the fact that sufficient wireless spectrum may be available, the fragmentation of the spectrum into sections available from different frequency bands typically limits the current user devices to operate in a single section at any given time.

Multi-band capable user devices exist, that is, devices which support multiple radio frequency bands. They may be used to support roaming between different access points that use different frequency bands.

When a device moves from the coverage area of one WLAN access point to the coverage area of another WLAN access point, the connection with the first access point breaks as the device moves out of range, and the device then begins to search for a new connection. This has the disadvantage that the device has a discontinuous connection.

SUMMARY

According to a first aspect of the present invention there is provided a method of operation of a network of WLAN access points comprising establishing a first WLAN access point having a first coverage area; and establishing a plurality of second WLAN access points having respective second coverage areas. The second access points provide traffic connections for at least one communications device in at least one of the respective second coverage areas. The first coverage area overlaps the plurality of second coverage areas, and the first WLAN access point provides control information for the at least one communications device.

In some embodiments, the first WLAN access point is operating in a first frequency band and the second WLAN access points are operating in at least one respective second frequency band, and the first frequency band is at a lower frequency than the or each second frequency band.

In some embodiments, the first WLAN access point establishes a lower data rate connection than the respective second WLAN access point with the at least one communications device.

According to a second aspect of the present invention there is provided a method of operation of a WLAN access point in a network of WLAN access points, the WLAN access point having a first coverage area, and the network further comprising a plurality of second WLAN access points having respective second coverage areas. The second access points provide traffic connections for at least one communications device in at least one of the respective second coverage areas, and the first coverage area overlaps the plurality of second coverage areas. The first WLAN access point provides control information for the at least one communications device.

According to a third aspect of the present invention there is provided a method of operation of a communications device in a network of WLAN access points, the network of access points comprising a first WLAN access point having a first coverage area and a plurality of second WLAN access points having respective second coverage areas, whereby the first coverage area overlaps with the plurality of second coverage areas. The method comprises establishing a control channel connection between the first WLAN access point and the communications device; establishing a traffic channel connection between one of the plurality of second WLAN access points and the communications device; and maintaining the control channel connection and the traffic channel connection at the same time.

In some embodiments, the control channel connection is established with the first WLAN access point in a first frequency band and the traffic channel connection is established with the one of the plurality of second WLAN access points in a respective second frequency band, wherein the first frequency band is at a lower frequency than the or each second frequency band.

In some embodiments, a lower data rate connection is established with the first WLAN access point than with the respective second WLAN access point.

According to a fourth aspect of the present invention there is provided a communications device, configured for use in a network comprising a network of WLAN access points, the network of WLAN access points comprising a first WLAN access point having a first coverage area and a plurality of second WLAN access points having respective second coverage areas, whereby the first coverage area overlaps with the plurality of second coverage areas. The communications device is configured for: establishing a control channel connection between the first WLAN access point and the communications device; establishing a traffic channel connection between one of the plurality of second WLAN access points and the communications device; and maintaining the control channel connection and the traffic channel connection at the same time.

In some embodiments, the communications device comprises a first radio transceiver configured to transmit and receive signals over the control channel connection; and a second radio transceiver configured to transmit and receive signals over the traffic channel connection.

The first and second radio transceivers may be configurable such that the first radio transceiver is used for transmitting and receiving signals over the control channel connection while second radio transceiver is being used for transmitting and receiving signals over the traffic channel connection.

In some embodiments, the communications device comprises a first radio transceiver configured to alternately transmit and receive signals over the control channel connection and over the traffic channel connection.

In some embodiments, the communications device is configured for establishing the control channel connection with the first WLAN access point in a first frequency band and establishing the traffic channel connection with the one of the plurality of second WLAN access points in a respective second frequency band, wherein the first frequency band is at a lower frequency than the or each second frequency band.

In some embodiments, the communications device is configured for: establishing a lower data rate connection with the first WLAN access point than with the respective second WLAN access point.

Thus, the first WLAN access point is able to provide a device with information regarding a new WLAN that it can connect to if the existing connection is broken. The first WLAN access point also allows better performance to be achieved by allowing some messages to be exchanged.

BRIEF DESCRIPTION OF THE DRAWINGS

For a better understanding of the present invention, and to show how it may be put into effect, reference will now be made, by way of example to the accompanying drawings, in which.

DETAILED DESCRIPTION

Figure 1:
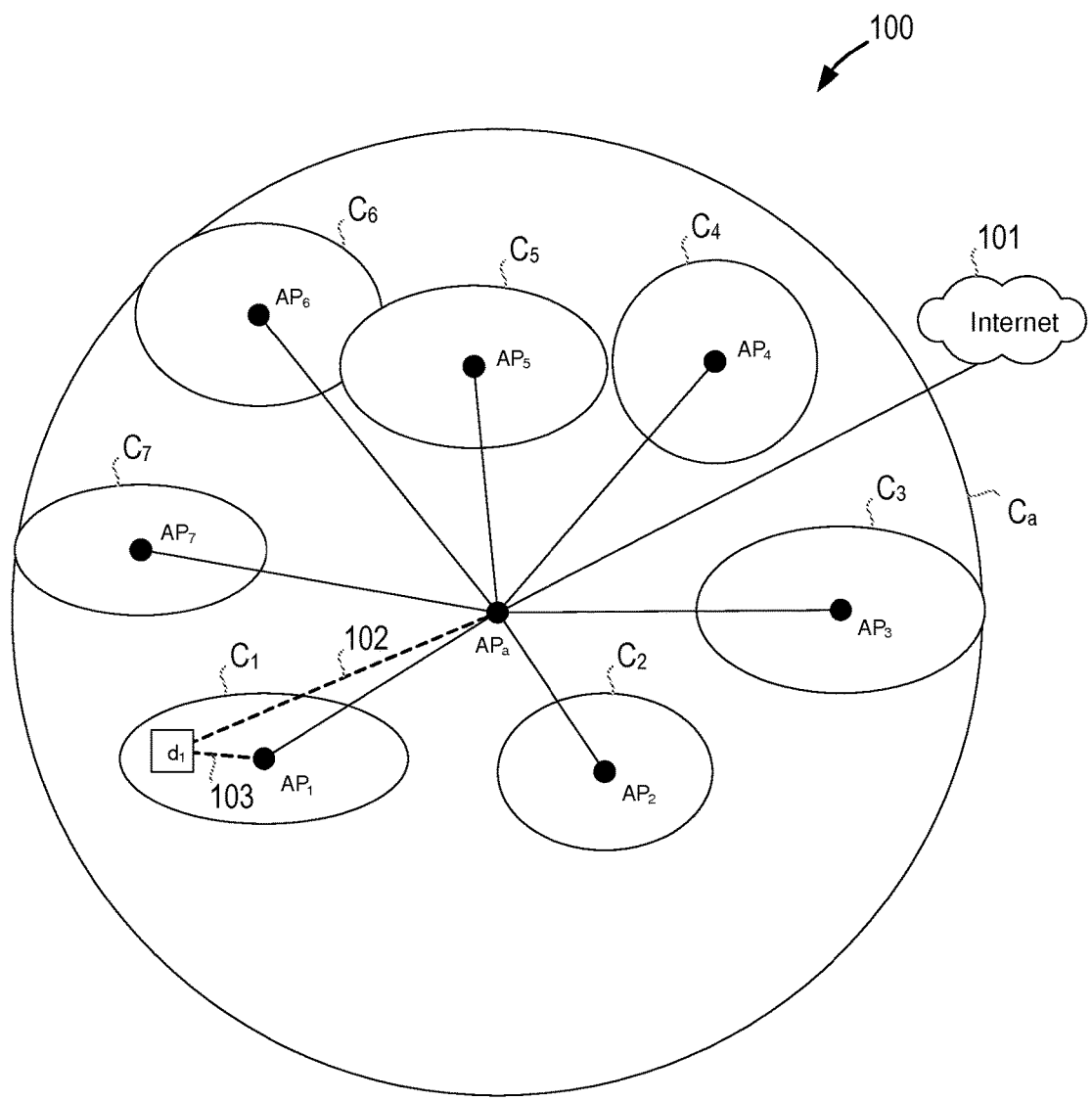
FIG. 1 illustrates an embodiment of a network.

FIG. 1 illustrates a network generally indicated 100 according to an embodiment of the invention.

The network 100 comprises multiple WLAN access points $AP_a$ and $AP_1, \ldots, AP_2, \ldots, AP_7$, each with a respective coverage area $C_a, C_1, C_2, \ldots, C_7$. Each WLAN access point incorporates one or more radio transceivers which allows it to operate in one or more frequency channels. Where a WLAN access point includes more than one radio transceiver, it can typically operate in multiple frequency channels simultaneously. Each WLAN access point is able to operate according to the standards defined according to IEEE 802.11, for example 802.11ax, 802.11ac, 802.11n, 802.11ah, or 802.11 ad. The WLAN access points may for example be able to operate in some or all of the frequency bands at 2.4 GHz, 5 GHz, 60 GHz, or sub-1 GHz.

Each of the WLAN access points $AP_a$ and $AP_1$, $AP_2, \ldots, AP_7$ allows a suitable user device that is within the respective coverage area $C_a, C_1, C_2, \ldots, C_7$ to establish a suitable connection with any other suitable user device that is able to receive service from a WLAN access point. For example, each of the WLAN access points $AP_a$ and $AP_1$, $AP_2, \ldots, AP_7$ allows a suitable user device that is within the respective coverage area $C_a, C_1, C_2, \ldots, C_7$ to establish a suitable connection with any other suitable user device that is within the same coverage area or another of the coverage areas $C_a, C_1, C_2, \ldots, C_7$, or is accessible over the internet 101.

FIG. 1 also shows one user device $d_1$, which in this case is within the coverage areas of the WLAN access points $AP_a$ and $AP_1$. It will be appreciated that there will typically be many such devices active within a network such as the network 100, but the methods described herein can be explained and understood by describing only one such device.

In FIG. 1, the communications device $d_1$, has a first connection 102 with the first WLAN access point $AP_a$, and has a second connection 103 with the second WLAN access point $AP_1$.

Figure 2A:
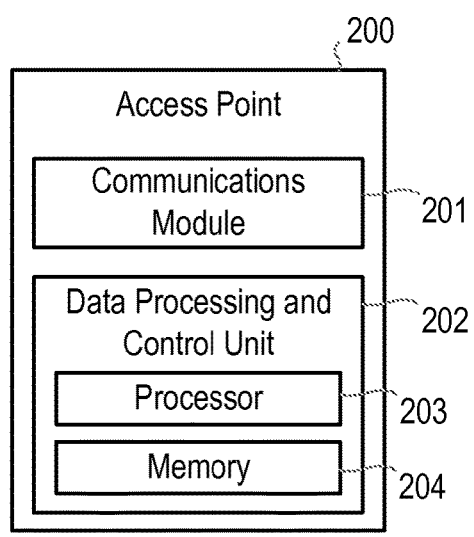
FIG. 2a is a block diagram illustrating a WLAN access point according to an embodiment of the invention.

FIG. 2a is a block diagram illustrating a WLAN access point generally indicated 200. Any or all of the WLAN access points $AP_a$ and $AP_1, AP_2, \ldots, AP_7$ shown in FIG. 1 may have this structure. In this embodiment, the WLAN access point 200 comprises a communications module 201 and a data processing and control unit 202. In particular, the data processing and control unit 202 comprises a processor 203 and a memory block 204.

The communications module 201 includes at least one radio transceiver, for allowing the WLAN access point 200 to communicate with user devices within its respective coverage area. The communications module 201 in this embodiment also includes circuitry for communicating over the internet 101. Thus, the communications module 201 is able to communicate with other network elements, for example over existing network infrastructure. For example, in a deployment within a single enterprise, the access points may be connected by an Ethernet backbone or other suitable network. In a deployment in a city, or in a rural area, the access points may be connected through the public Internet infrastructure. Other possibilities exist for connecting the communications modules of multiple WLAN access points.

The data processing and control unit 202 allows the WLAN access point 200 to perform the functions required for its operation, including the functions described herein. For example, the memory block 204 may contain stored program instructions for causing the processor 203 to perform the methods described herein.

Figure 2B:
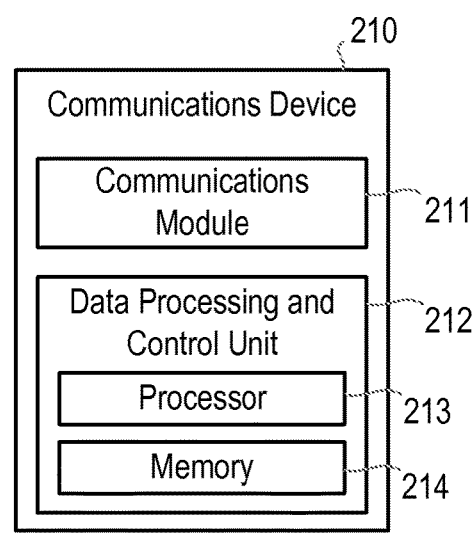
FIG. 2b is a block diagram illustrating a communications device according to an embodiment of the invention.

FIG. 2b is a block diagram illustrating a communications device such as the device $d_1$, generally indicated 210. In this embodiment, the communications device comprises a communications module 211 and a data processing and control unit 212. In particular, the data processing and control unit 212 comprises a processor 213 and a memory block 214.

The communications module 211 includes at least one radio transceiver, for example for allowing the device 210 to communicate with an access point, when the communications device is within the respective coverage area of the access point, and thereby communicate with other devices over the internet 101.

The data processing and control unit 212 allows the device 210 to perform the functions required for its operation, including the functions described herein. For example, the memory block 214 may contain stored program instructions for causing the processor 213 to perform the methods described herein.

Figure 3:
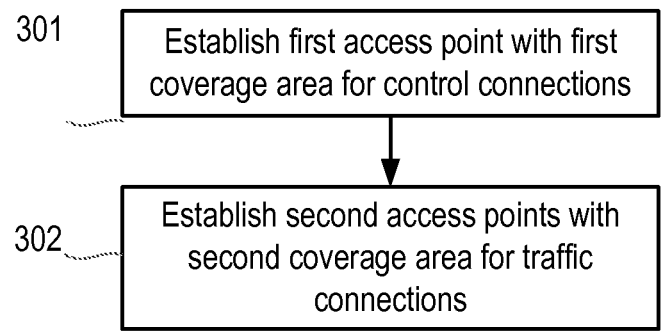
FIG. 3 is a flow chart illustrating a method of establishing a network as shown in FIG. 1.

FIG. 3 is a flow chart illustrating a method in accordance with one embodiment.

In FIG. 3, a first WLAN access point is established in step 301, having a first coverage area. Referring to FIG. 1, the first WLAN access point may be the access point $AP_a$, having a coverage area $C_a$.

One or more second WLAN access points are established in step 302, having respective second coverage areas. Referring to FIG. 1, the second WLAN access points may be the access points $AP_1$, $AP_2$, ..., $AP_7$, having the respective coverage areas $C_1$, $C_2$, ..., $C_7$.

It can be seen from FIG. 1 that, in this embodiment, the coverage area of the first WLAN access point $AP_a$ overlaps the coverage areas of the plurality of second WLAN access points $AP_1$, $AP_2$, ..., $AP$,. This means that any communications device, such as the device $d_1$, that is within the coverage area of one of the second WLAN access points is also within the coverage area of the first WLAN access point $AP_a$.

In this illustrated embodiment, the first WLAN access point $AP_a$ overlaps the coverage areas of the plurality of second WLAN access points $AP_1$, $AP_2$, ..., $AP_7$, and this is achieved by operating the first WLAN access point $AP_a$ with a relatively long range frequency channel. This long range channel then acts as an anchor channel.

As an example, the first WLAN access point $AP_a$ may be an IEEE 802.11ah access point, operating in the 900 MHz frequency band, while the plurality of second WLAN access points $AP_1$, $AP_2$, ..., $AP_7$ are IEEE 802.11a/g/n/ac/ax or 802.11b access points, operating in the 2.4 GHz or 5 GHz frequency bands.

As another example, the first WLAN access point $AP_a$ may be an IEEE 802.11a/g/n/ac/ax access point, operating in the 2.4 GHz or 5 GHz frequency band, while the plurality of second WLAN access points $AP_1$, $AP_2$, ..., $AP_7$ are operating in the 60 GHz frequency band. Other examples are of course possible.

In general, the first WLAN access point $AP_a$ is able to operate with a relatively long range frequency channel, and therefore have a coverage area that overlaps the coverage areas of all of the second WLAN access points $AP_1$, $AP_2$, ..., $AP_7$, if it operates in a lower frequency band than the second WLAN access points. However, other possibilities exist.

Thus, the network 100 consists of multiple WLAN access points, with the first WLAN access point providing an anchor channel. A newly registering access point agrees with the network upon the anchor frequency channel. The newly registering access point may then monitor the anchor channel, for example constantly or according to a schedule agreed between the first WLAN access point and the newly registering access point.

The anchor access point $AP_a$ is then able to communicate via fixed infrastructure with the multiple second access points $AP_1$, $AP_2$, ..., $AP_7$ that are within its coverage area. Similarly, the second access points are able to communicate with the anchor access point.

Figure 4:
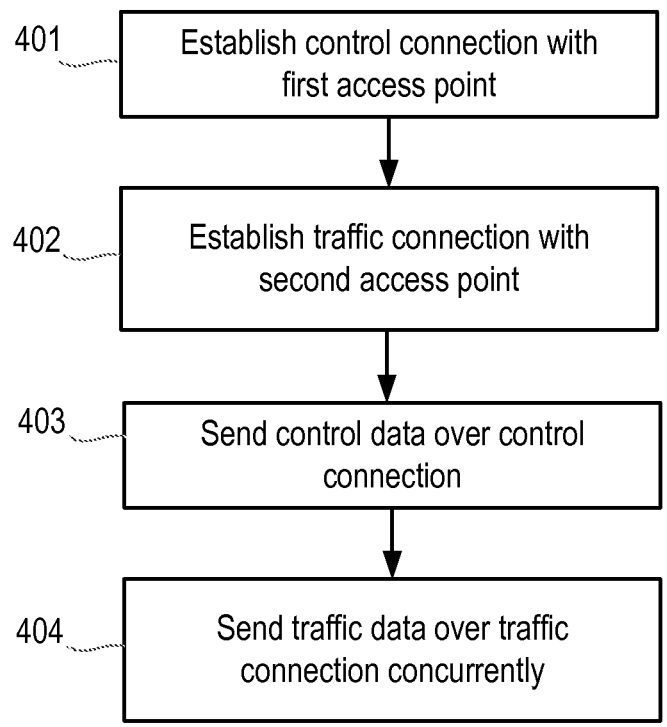
FIG. 4 is a flow chart illustrating a method of operation of a communications device in a network such as that shown in FIG. 1.

FIG. 4 is a flow chart of the method of operation of a communications device in a network such as that described above. This method will be described, by way of example, from the point of view of a communications device such as the device $d_1$ shown in FIG. 1.

In step 401, the communications device establishes a control channel connection, illustrated in FIG. 1 by the reference numeral 102, with a first WLAN access point.

The first WLAN access point may be the WLAN access point that is providing an anchor channel, as described above. Thus, in the example described with reference to FIG. 3, the communications device $d_1$ establishes a control channel connection with the first WLAN access point $AP_a$ over the anchor frequency channel.

In step 402, the communications device establishes a traffic channel connection illustrated in FIG. 1 by the reference numeral 103, with one of the plurality of second WLAN access points. In the example described with reference to FIG. 3, the communications device $d_1$ establishes the traffic channel connection 103 with the second WLAN access point $AP_1$.

Then, in operation, in step 403 the communications device sends control data to, or receives control data from, the first WLAN access point over the control channel connection, and, in step 404, the communications device sends payload data to, or receives payload data from, the second WLAN access point $AP_1$.

In the network illustrated in FIG. 1, the anchor WLAN access point $AP_a$ receives all of the frames of data sent to or from any of the communications devices, such as the device $d_1$, within the network. In the case of traffic being sent to the communications device $d_1$, the anchor WLAN access point $AP_a$ is able to determine which of the plurality of second WLAN access points should be used. The connection 103 between the communications device $d_1$ and the second access point AP, may already exist at this time, or may be established in response to determining that there is data to be sent to the device. The anchor WLAN access point $AP_a$ then sends the data to the one of the second access points, and it is then sent from the one of the second access points to the communications device. This centralisation of the overlay network function allows communications devices within the network to operate using a single media access control (MAC) address, which is carried in data frames carried over both the wireless connections 102 and 103. The anchor WLAN access point $AP_a$ can then act as a filter preventing the traffic from being delivered on the wrong path.

As described in more detail below, the device $d_1$ maintains the control channel connection and the traffic channel connection at the same time, and is able to monitor the two wireless connections 102 and 103 continuously.

In this case, the connection between the communications device and the anchor access point may be a lower data rate connection than the connection between the communications device and the respective second WLAN access point because, in some circumstances, less data is required to be sent over this control channel connection.

For example, the control information sent by the anchor access point may inform a communications device of a candidate second WLAN access point for handover purposes, or the control information may instruct a communications device to establish a traffic connection with a specific second WLAN access point, or the control information may comprises a status message.

Figure 5:
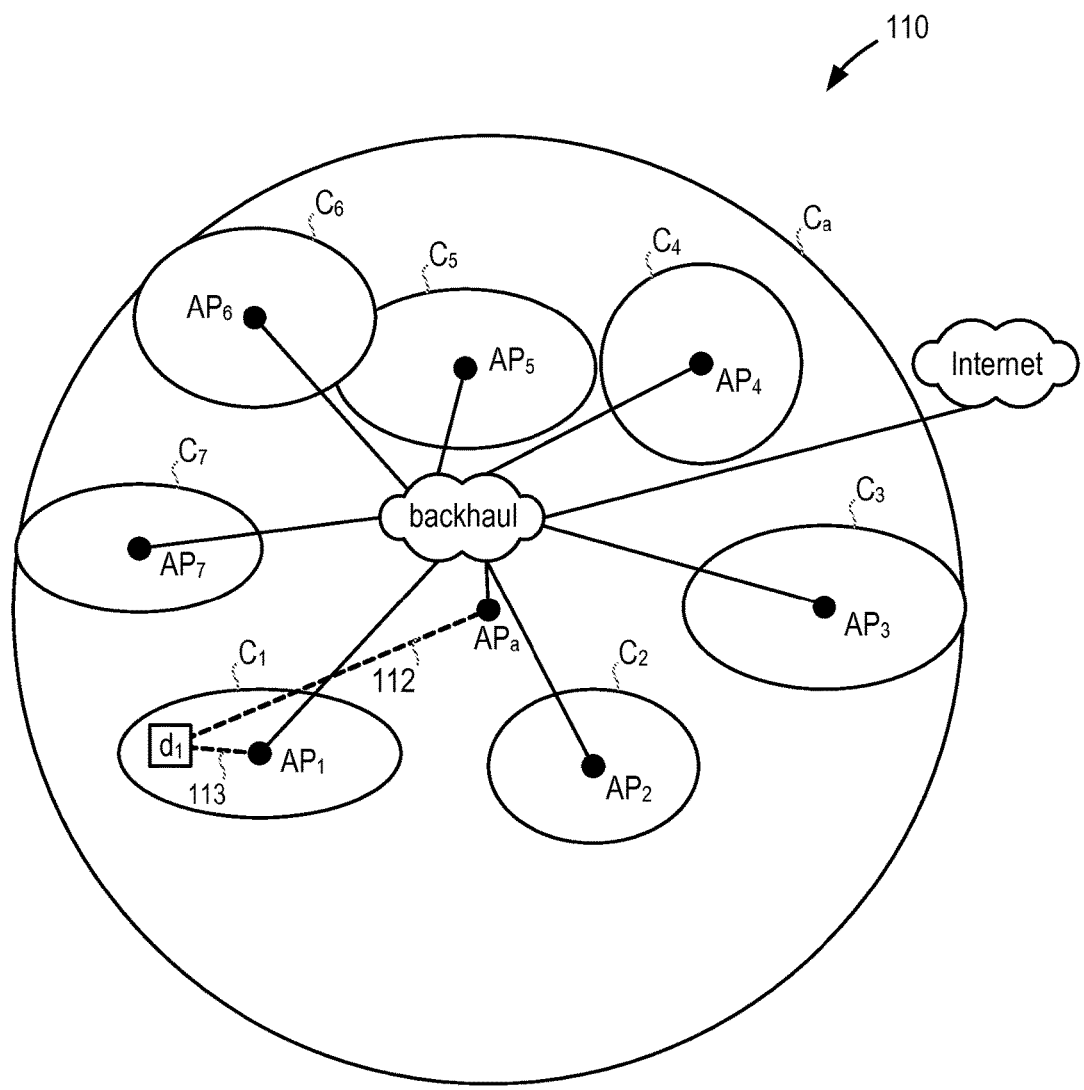
FIG. 5 illustrates a network according to another embodiment.

FIG. 5 illustrates a second network 110 according to an embodiment of the invention. The network shown in FIG. 5 is generally similar to that shown in FIG. 1, and corresponding features are indicated by the same reference numerals.

Thus, the network 110 comprises multiple WLAN access points $AP_a$ and $AP_1$, $AP_2$, ..., $AP_7$, each with a respective coverage area $C_a$, $C_1$, $C_2$, ..., $C_7$. Each WLAN access point incorporates one or more radio transceivers which allows it to operate in one or more frequency channels. Where a WLAN access point includes more than one radio transceiver, it can typically operate in multiple frequency channels simultaneously. Each WLAN access point is able to operate according to the standards defined according to IEEE 802.11, for example 802.11ax, 802.11ac, 802.11n, 802.11ah, or 802.11 ad. The WLAN access points may for example be able to operate in some or all of the frequency bands at 2.4 GHz, 5 GHz, 60 GHz, or sub-1 GHz.

Each of the WLAN access points $AP_a$ and $AP_1$, $AP_2, \ldots, AP_7$ allows a suitable user device that is within the respective coverage area $C_a, C_1, C_2, \ldots, C_7$ to establish a suitable connection with any other suitable user device that is able to receive service from a WLAN access point. For example, each of the WLAN access points $AP_a$ and $AP_1$, $AP_2, \ldots, AP_7$ allows a suitable user device that is within the respective coverage area $C_a, C_1, C_2, \ldots, C_7$ to establish a suitable connection with any other suitable user device that is within the same coverage area or another of the coverage areas $C_a, C_1, C_2, \ldots, C_7$, or is accessible over the internet 101.

FIG. 5 also shows one user device $d_1$, which in this case is within the coverage areas of the WLAN access points $AP_a$ and $AP_1$. It will be appreciated that there will typically be many such devices active within a network such as the network 110, but the methods described herein can be explained and understood by describing only one such device.

In FIG. 5, the communications device $d_1$, has a first connection 112 with the first WLAN access point $AP_a$, and has a second connection 113 with the second WLAN access point $AP_1$.

FIG. 5 also shows a part of the network infrastructure 301 by which each of the WLAN access points $AP_a$ and $AP_1$, $AP_2, \ldots, AP_7$ is connected to the internet 101. In this example, the network topology does not support the aggregation of the traffic at a central anchor WLAN access point, and so the backhaul infrastructure 301 is used for all traffic to and from any communications device connected to each of the WLAN access points.

Thus, in this example, the communication devices in the network may use two different MAC addresses, to avoid the issue that the device with a single MAC address may simultaneously be connected to both the WLAN access point $AP_1$ and the anchor WLAN access point $AP_a$. In that case, incoming data intended for the device $d_1$ may be sent randomly through either the WLAN access point $AP_1$ or the anchor WLAN access point $AP_a$. This confusion is avoided in this example, as the device $d_1$ uses two MAC addresses, one for its connection to the WLAN access point $AP_1$ for payload traffic data, and the other for the control channel connection to the anchor WLAN access point $AP_a$.

While the device $d_1$ has connections to the WLAN access point $AP_1$ and to the anchor WLAN access point $AP_a$, it may avoid issuing DHCP requests that contain the MAC address that is used for the wireless link to the anchor WLAN access point $AP_a$, reserving this MAC address for local network management only. This ensures that the payload traffic is received over a single path, through the WLAN access point $AP_1$.

However, if the device d, moves, so that it is out of range of any of the WLAN access points $AP_1, \ldots, AP_7$, the MAC address used for payload data communication can be used with the anchor access point $AP_a$. At this point, the anchor WLAN access point $AP_a$ will be aware that the device $d_1$ is using two MAC addresses, and can ensure that it forwards frames containing control information using the MAC address associated with the control channel connection and forwards frames containing payload data traffic using the MAC address associated with the traffic connection.

Figure 6:
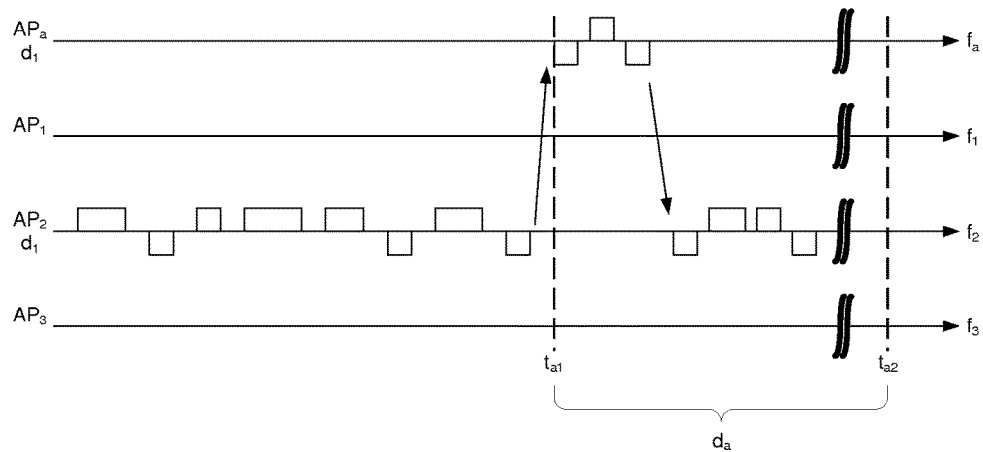
FIG. 6 is a time history showing data transmitted between a communications device and four WLAN access points.

FIG. 6 is a time history, showing data transmitted between the communications device $d_1$ and four WLAN access points $AP_a, AP_1, AP_2$ and $AP_3$. In this illustrative example, the four WLAN access points are operating on four different frequencies, namely $f_a, f_1, f_2$ and $f_3$ respectively.

In this example, the communications device $d_1$ has only a single, multi-band capable radio transceiver and hence is not able to continuously monitor both the control channel connection and the traffic channel connection.

However, the device is still able to establish a control channel connection with the first WLAN access point $AP_a$, establish a traffic channel connection with one of the plurality of second WLAN access points, namely $AP_2$ in this illustrated situation, and to maintain the control channel connection and the traffic channel connection at the same time. It is then able to receive data effectively concurrently from the anchor access point and the one of the plurality of second access points to which it is connected.

To do this, the device can switch between the second WLAN access point to which it is connected, i.e. with the traffic channel connection, and the anchor WLAN access point, i.e. the control channel connection, in order to effectively exchange management and/or control data.

The radio transceiver will therefore be configured to alternatively transmit and receive signals over the control channel connection and the traffic channel connection.

Initially, as shown in FIG. 6, the device d, is receiving traffic data from, and transmitting traffic data to, the WLAN access point $AP_2$ on the frequency channel $f_2$. At time $t_{a1}$ the device switches to exchanging management data with the anchor WLAN access point $AP_a$ on a different frequency channel $f_a$. Once all of the necessary control data has been received, the device $d_1$ switches back to transmitting traffic data to the WLAN access point $AP_2$ on the frequency channel $f_2$.

The device $d_1$ may periodically switch the frequency of its radio transceiver to the anchor frequency $f_a$ to connect to the anchor WLAN access point $AP_a$. In this embodiment, there is a fixed time $d_a$ between each switch to the anchor frequency channel $f_a$.

The time $d_a$ may be negotiated by the device $d_a$ and the anchor WLAN access point $AP_a$. Therefore, the anchor WLAN access point $AP_a$ will be aware of when to expect a connection from the device $d_a$ on the frequency $f_a$. Furthermore, the device $d_1$ may inform the WLAN access point $AP_2$ of its absence on the frequency channel $f_2$, allowing the WLAN access point $AP_2$ to buffer any incoming data to transmit to the device $d_1$ when it returns to the frequency channel $f_2$. Thus, the connection on the traffic channel can appear to the user to be constant.

Figure 7:
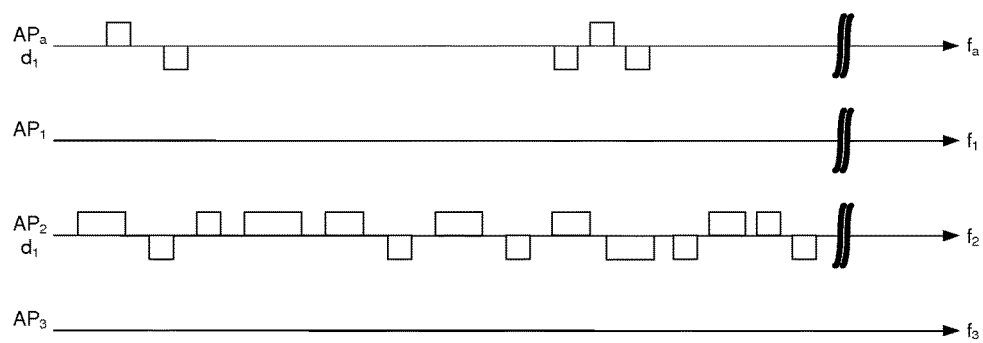
FIG. 7 is a second time history showing data transmitted between the communications device and the four WLAN access points.

FIG. 7 is a second time history, showing data transmitted between the communications device $d_1$ and four WLAN access points $AP_a, AP_1, AP_2$ and $AP_3$.

Again, in this illustrative example, the four WLAN access points are operating on four different frequencies, namely $f_a$, $f_1, f_2$ and $f_3$ respectively.

However, in this example, the communications device $d_1$ has at least two multi-band capable radio transceivers and is therefore able to continuously monitor both the control channel connection and the traffic channel connection.

In this case, the device can have one radio transceiver continuously monitoring the traffic channel connection on the frequency $f_2$, and another radio transceiver continuously monitoring the control channel connection of the frequency $f_a$. The data received on the control channel connection may still be received periodically.

Thus, the device is again able to establish a control channel connection with the first WLAN access point $AP_a$, establish a traffic channel connection with one of the plurality of second WLAN access points, namely $AP_2$ in this illustrated situation, and to maintain the control channel connection and the traffic channel connection at the same time. It is then able to receive data simultaneously from the anchor access point and the one of the plurality of second access points to which it is connected.

Figure 8:
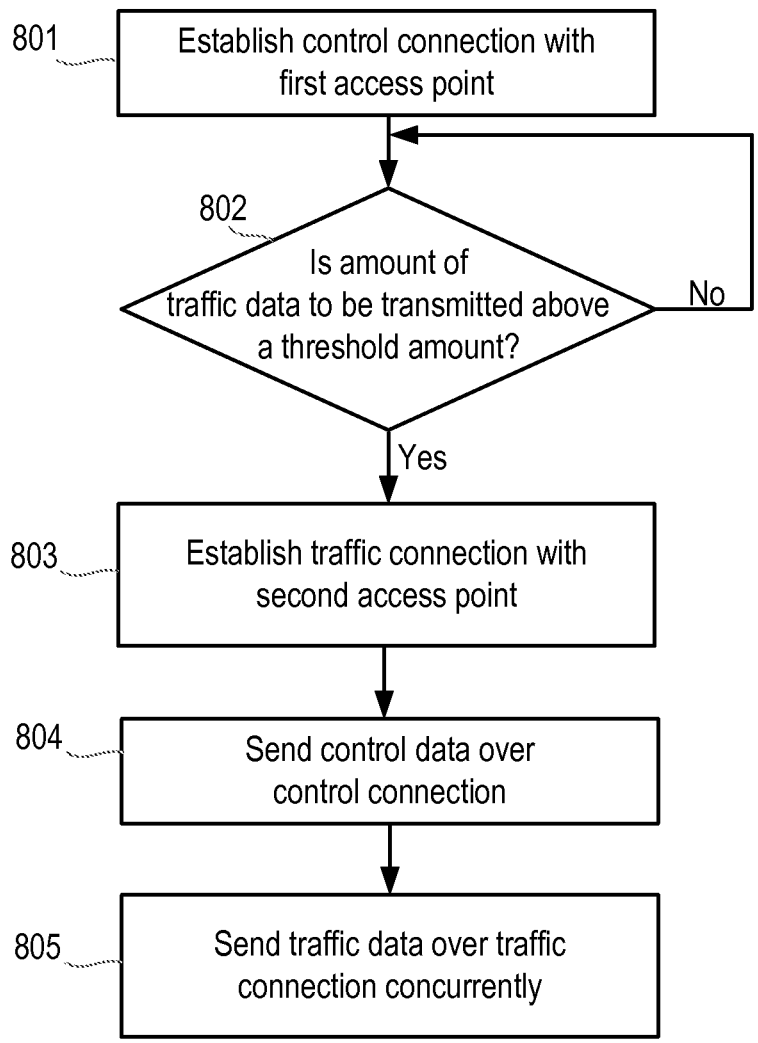
FIG. 8 is a flow chart illustrating a method of operation of a communications device.

FIG. 8 is a flow chart illustrating a method of operation of a communications device and a WLAN access point according to an embodiment of the invention, illustrating a situation where the maintenance of an anchor channel is useful, namely in situations where the communications device $d_1$ is communicating only intermittently with other devices.

In step 801 a control channel connection is established between the communications device and a WLAN access point. Specifically, this control channel connection is established between the communications device and an anchor WLAN access point. In this embodiment, the communications device operates in idle mode if its traffic requirements are zero or low.

In step 802, it is determined if the amount of traffic data to be transferred, or the rate required for the traffic data to be transferred, is above a threshold amount. This determination may take place either in the communications device itself, or in the anchor WLAN access point. In some embodiments, the threshold value may be zero, while, in other embodiments, the threshold value may be some real positive value.

If it is determined in step 802 that the traffic amount is below the threshold amount, the communications device remains in idle mode. No traffic channel connection exists, but small amounts of data may be transmitted over the control channel connection if required. Step 802 is then repeated, and the amount of traffic data to be transferred is continually monitored.

If it is determined in step 802 that the traffic amount exceeds the threshold amount, and a high speed communication channel is required, a traffic channel connection is established in step 803. If data traffic is already being sent over the control channel connection, it is possible, for example, to monitor a number of dropped packets or a delay per packet as an indication that the amount of traffic exceeds a threshold amount and that it is necessary to establish a high-speed link. Alternatively, Access Categories or other QoS indications may provide input as to whether a high-speed link should be established.

If a high speed communication channel is required, this connection is established between the communications device and a second WLAN access point in the coverage area of which the communications device is located. The second WLAN access point may be selected by the communications device itself, or may be selected by the anchor WLAN access point and signalled to the communications device.

The control channel connection is maintained, as shown in step 804, and control data and management data are still sent over the control channel connection.

Traffic data is now sent over the traffic channel connection, as shown in step 805. Specifically, the traffic data may be sent effectively concurrently with the control data, either because the communications device is able to maintain simultaneous traffic and control data connections using two radios operating at different frequencies, or because the communications device is able to switch a single radio between the different frequencies used for the traffic and control data connections such that it can transmit and/or receive data without loss of data.

Figure 9:
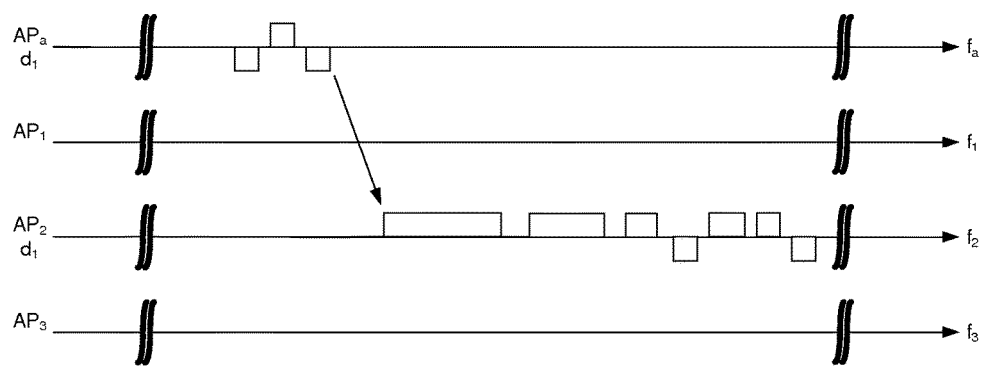
FIG. 9 is a third time history showing data transmitted between the communications device and the four WLAN access points.

FIG. 9 is a third time history, showing data transmitted between the communications device $d_1$ and four WLAN access points $AP_a$, $AP_1$, $AP_2$ and $AP_3$, during the process shown in FIG. 8. Again, in this illustrative example, the four WLAN access points are operating on four different frequencies, namely $f_a$, $f_1$, $f_2$ and $f_3$ respectively.

Initially, the device $d_1$ is operating in idle mode, only maintaining a control channel connection to the anchor WLAN access point $AP_a$, and transmitting and receiving control data over the control channel connection. As the communications device has low or zero traffic requirements, it is inefficient to maintain the traffic channel connection when there is very little traffic being sent.

If traffic data then arrives at the anchor WLAN access point $AP_a$ intended for the device $d_1$, the anchor WLAN access point wakes the device from idle mode and informs it about the inbound traffic data. Alternatively, if the traffic is generated at the device the device informs the anchor WLAN access point of the need for a high speed traffic channel connection.

When either the anchor WLAN access point or the communications device is signalling the arrival of traffic, they may indicate an estimate of the amount of traffic buffered so far and/or the expected packet size and/or the packet rate arrival and/or an estimated average traffic throughput and/or the expected duration of the traffic flow and/or any other traffic characteristics. Some or all of this information can be used to help the communications device $d_1$ and/or the anchor access point $AP_a$ to determine which of the plurality of second access points provides a suitable high speed traffic channel connection.

The communications device and the anchor WLAN access point then negotiate which of the surrounding plurality of access points provide a suitable connection and have sufficient capacity to carry the additional traffic.

In this example, the access point $AP_2$ is chosen to provide the traffic channel connection. Thus, FIG. 9 shows data being transmitted between the communications device and the selected second access point $AP_2$.

If the communications device comprises multiple radio transceivers, then, once the traffic channel connection frequency has been identified, it will activate one of this dormant radio transceivers on the traffic channel connection frequency, in this illustrated situation the frequency $f_2$.

If the communications device comprises a single radio transceiver, then, once the traffic channel connection frequency has been identified, it will switch the frequency of the single radio transceiver to the traffic channel connection frequency, in this illustrated situation $f_2$.

Whether the communications device has single or multiple radio transceivers, the anchor WLAN access point and the WLAN access point $AP_2$ selected for the traffic channel connection may have exchanged encryption keys prior to the communications device starting to communicate with the traffic channel connection access point $AP_2$. This allows the communications device $d_1$ to immediately start to communicate with the access point $AP_2$ without having to undergo a time consuming handshake protocol.

For communications devices with multiple radio transceivers, the control channel connection may be continuously maintained when the communications device moves out of idle mode, so that data may be transmitted over both the traffic channel connection and the control channel connection.

The control channel connection may also act as a back-up path for the transfer of traffic data if the high speed traffic channel connection is lost.

Figure 10:
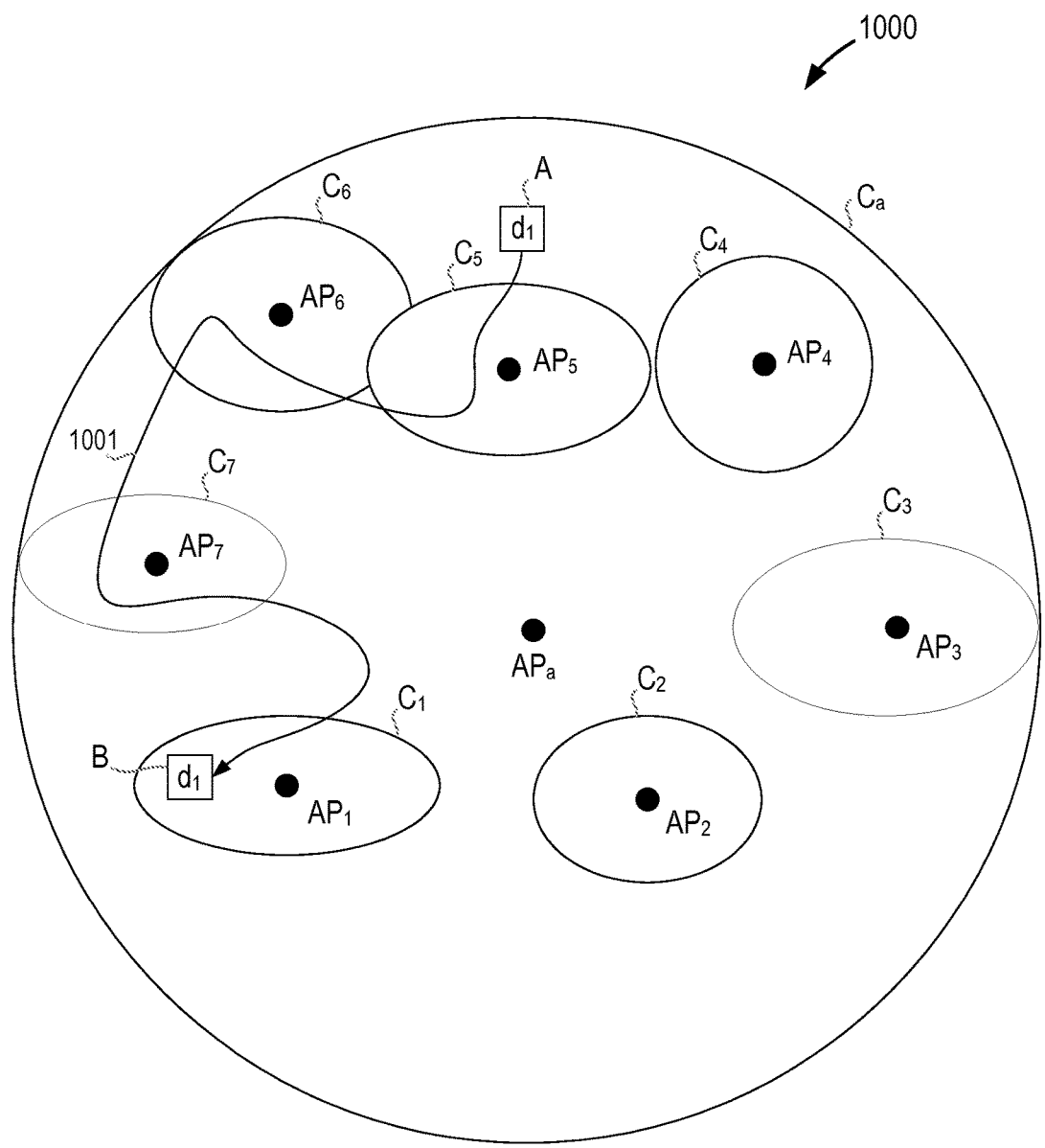
FIG. 10 illustrates a network according to another embodiment.

FIG. 10 illustrates a situation where the maintenance of an anchor channel is useful, namely during the movement of a communications device $d_1$ across wireless local area networks. Thus, FIG. 10 illustrates a network that is generally similar to that shown in FIG. 1, and corresponding features are indicated by the same reference numerals.

Thus, the network 1000 comprises multiple WLAN access points $AP_a$ and $AP_1$, $AP_2$, ..., $AP_7$, each with a respective coverage area $C_a$, $C_1$, $C_2$, ..., $C_7$. Each WLAN access point incorporates one or more radio transceivers which allows it to operate in one or more frequency channels. Where a WLAN access point includes more than one radio transceiver, it can typically operate in multiple frequency channels simultaneously. Each WLAN access point is able to operate according to the standards defined according to IEEE 802.11, for example 802.11ax, 802.11ac, 802.11n, 802.11ah, or 802.11 ad. The WLAN access points may for example be able to operate in some or all of the frequency bands at 2.4 GHz, 5 GHz, 60 GHz, or sub-1 GHz.

Each of the WLAN access points $AP_a$ and $AP_1$, $AP_2$, ..., $AP_7$ allows a suitable user device that is within the respective coverage area $C_a$, $C_1$, $C_2$, ..., $C_7$ to establish a suitable connection with any other suitable user device that is able to receive service from a WLAN access point. For example, each of the WLAN access points $AP_a$ and $AP_1$, $AP_2$, ..., $AP_7$ allows a suitable user device that is within the respective coverage area $C_a$, $C_1$, $C_2$, ..., $C_7$ to establish a suitable connection with any other suitable user device that is within the same coverage area or another of the coverage areas $C_a$, $C_1$, $C_2$, ..., $C_7$, or is accessible over the internet.

FIG. 10 also shows the movement of one user device $d_1$. It will be appreciated that there will typically be many such devices active within a network such as the network 1000, but the methods described herein can be explained and understood by describing only one such device.

In this illustrated case, the device $d_1$ moves from a first position A to a final position B following the trace indicated 1001.

As the device moves through the network, the communications device $d_1$ maintains a connection over the control channel to the anchor WLAN access point $AP_a$, which will instruct the communications device to change the frequency of its traffic channel connection so that it is connected to the most suitable traffic channel connection. For example, in the trace shown in FIG. 10, the communications device will have changed the frequency of its traffic channel connection to connect to $AP_5$, $AP_6$, $AP_7$ and then finally $AP_1$.

At times, the communications device $d_1$ is outside the coverage areas of all of the second WLAN access points $AP_1$, $AP_2$, ..., $AP_7$, but will be able to maintain its control channel connection to the anchor WLAN access point $AP_a$. During these periods, the communications device and the anchor WLAN access point $AP_a$ can exchange small amounts of data over the control channel connection.

While it is moving, the communications device uses the control channel connection to the anchor WLAN access point $AP_a$ to indicate radio channel measurement data as well as to receive frequency channel and traffic channel selection guidance. The communications device $d_1$ can therefore avoid undertaking any time consuming scanning for neighbouring access points.

The control channel connection may also help in building a radio coverage map. Client devices often have lower transmit power than access points. For example, an access point may transmits at 20 dBm power and client devices may transmit at 15 dBm power or less, while the receiving capabilities of client devices and access points might be similar. Thus, it can happen that a client device in a zone at the edge of an access point's coverage area is able to receive transmissions from the access point, but is unable to transmit signals with sufficient power to be received by the access point.

However, even while the client device is unable to transmit with sufficient power for its signals to be received by the access point over the high-capacity, short-range link, it may still be able to transmit to an anchor access point over a longer-range channel. It can then signal to the anchor access point that it is able to receive the transmissions from the access point, and the corresponding received signal strength. Thus, the network manager/operator can build a map of actual reception and/or response ranges.

To create the radio coverage map, the present position of a particular communications device may be determined using a global navigation satellite system (GNSS), triangulation, or any other suitable method. The communications device can then signal its location, and the WLAN signals that it can detect, to the anchor WLAN access point, so that the anchor WLAN access point can generate a radio coverage map.

Then, other devices may request support in positioning estimation over the control channel connection. The devices can measure the signal strength of control messages received from the anchor access point, and signal their measurement results back to the anchor access point. The coverage map may then be used to help determine the device's position.

Figure 11:
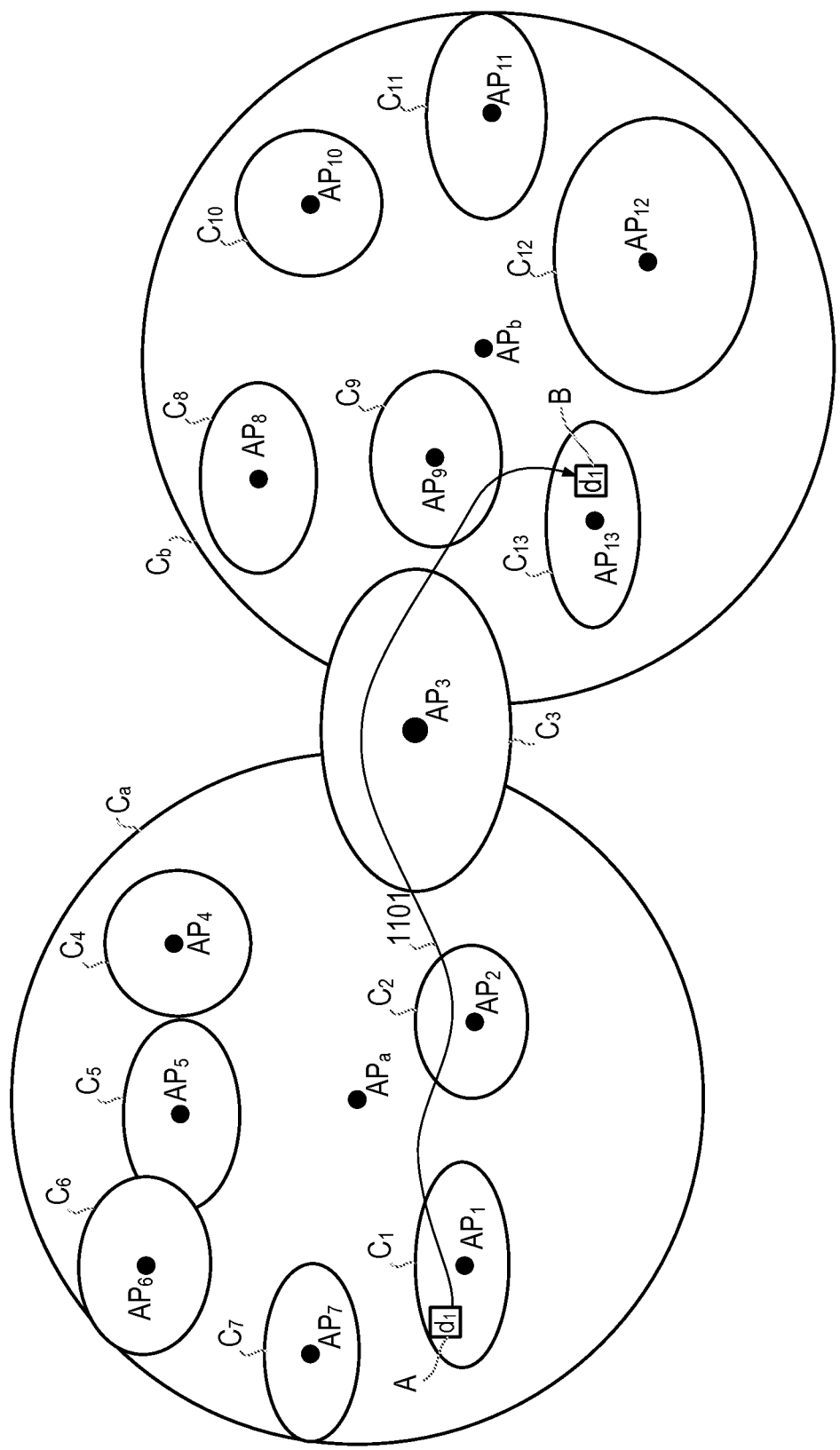
FIG. 11 illustrates a network according to another embodiment.

FIG. 11 illustrates a further situation where the maintenance of an anchor channel is useful, namely during the movement of a communications device $d_1$ across wireless local area networks. Thus, FIG. 11 illustrates a network 1100, comprising multiple WLAN access points $AP_a$, $AP_b$ and $AP_1$, $AP_2$, ..., $AP_{13}$, each with a respective coverage area $C_a$, $C_b$, $C_1$, $C_2$, ..., $C_{13}$. Each WLAN access point incorporates one or more radio transceivers which allows it to operate in one or more frequency channels. Where a WLAN access point includes more than one radio transceiver, it can typically operate in multiple frequency channels simultaneously. Each WLAN access point is able to operate according to the standards defined according to IEEE 802.11, for example 802.11ax, 802.11ac, 802.11n, 802.11ah, or 802.11ad. The WLAN access points may for example be able to operate in some or all of the frequency bands at 2.4 GHz, 5 GHz, 60 GHz, or sub-1 GHz.

Each of the WLAN access points $AP_a$, $AP_b$ and $AP_1$, $AP_2$, ..., $AP_{13}$ allows a suitable user device that is within the respective coverage area $C_a$, $C_b$, $C_1$, $C_2$, ..., $C_{13}$ to establish a suitable connection with any other suitable user device that is able to receive service from a WLAN access point.

In the example illustrated in FIG. 11, the coverage area of the WLAN access point $AP_a$ overlaps the coverage areas of the plurality of second WLAN access points $AP_1$, $AP_2$, $AP_4$, ..., $AP_7$ and partially overlaps the coverage area of the WLAN access point $AP_3$, while the coverage area of the WLAN access point $AP_b$ overlaps the coverage areas of the plurality of second WLAN access points $AP_8$, $AP_9$, ..., $AP_{13}$ and partially overlaps the coverage area of the WLAN access point $AP_3$, but the anchor access points $AP_a$ and $AP_b$ have coverage areas which are mutually exclusive, i.e. they do not overlap.

Thus, the access points $AP_a$ and $AP_b$ can act as anchor WLAN access points for communications devices that are within their respective coverage areas, and can be used to provide respective control channel connections. However, any device travelling from the coverage area $C_a$ to the coverage area $C_b$ may lose connectivity to the control channel connection.

FIG. 11 shows the movement of one such communications device $d_1$, travelling from its starting position A, in the coverage area of the anchor access point $AP_a$, to its final position B, in the coverage area of the anchor access point $AP_b$, as indicated by the travel pathway 1101. In this illustrated case, one of the plurality of second access points, $AP_3$, is positioned such that its coverage area intersects with the coverage areas of the two anchor access points $AP_a$ and $AP_b$. Therefore, when the communications device $d_1$ is travelling between the respective coverage areas of the anchor access points, it may connect to access point $AP_3$ to receive guidance about how best to transition between the access points $AP_a$ and $AP_b$.

In the example illustrated in FIG. 11, the two anchor access points $AP_a$ and $AP_b$ might be connected by an Ethernet switch at Layer 2. Thus a device in the coverage area of one anchor access point could communicate with a device in the other anchor access point's coverage area without traversing the Internet, as the Internet is a layer 3 (IP layer) network.

There are therefore disclosed methods and devices for operating a network of WLAN access points to provide coverage for communications devices.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of operating a Wireless Local Access Network (WLAN) comprising:
    operating a first Access Point (AP) as an anchor node within an overall coverage area of the WLAN, including providing one or more first frequency channels via the first AP having a coverage range extending over the overall coverage area;
    operating a plurality of second APs as respective traffic nodes within the overall coverage area of the WLAN, including providing one or more second frequency channels via each second AP having a coverage range extending over a corresponding second coverage area subsumed in the overall coverage area; and
    exchanging control data with all communications devices operating in the WLAN via the first AP, the control data effecting network management control of the communications devices with respect to the WLAN, and selectively exchanging traffic data with individual ones of the communications devices via respective ones of the second Aps;
    wherein the first AP and the plurality of second APs communicatively couple to a backhaul network, and wherein the traffic data being exchanged with any given communications device flows through the second AP or the second APs currently being used for exchanging the traffic data with the given communications device without passing through the first AP, and
    wherein the method further comprises using a first Medium Access Control (MAC) identifier (ID) for the given communications device at the first AP, and using one or more second MAC IDs for the given communications device at the second AP or the second APs currently being used for exchanging the traffic data with the given communications device.

2. The method of claim 1, wherein, for extending coverage of the first frequency channels over the overall coverage area, the method includes using a lower frequency band for the first frequency channels, from among two or more defined frequency bands available for operating the first AP and the plurality of second APs, and using one or more higher frequency bands for the second frequency channels provided by each second AP.

3. The method of claim 1, wherein exchanging control data with all communications devices operating in the WLAN via the first AP comprises exchanging handover control signaling with individual ones of the communications devices, in conjunction with movement of the individual ones of the communications devices between respective ones of the second coverage areas, the handover signaling controlling which second AP or which second APs are used for exchanging traffic data with individual ones of the communications devices.

4. The method of claim 3, further comprising sending further handover control signaling from the first AP to respective ones of the second APs, to coordinate the handover of individual ones of the communications devices between the respective ones of the second APs.

5. The method of claim 4, further comprising evaluating loading information at the first AP, for two or more second APs that are candidates for receiving a given one of the communications devices in handover, and selecting which one of the second APs to use for the handover in dependence on the relative loading.

6. The method of claim 1, wherein operating the first AP as the anchor node further comprises:
    receiving all outgoing traffic data for delivery to the communications devices at the first AP, and forwarding the outgoing traffic data to respective ones of the second APs; and
    receiving all incoming data traffic from the communications devices at the first AP, as forwarded to the first AP from respective ones of the second APs, and forwarding the incoming data traffic for delivery.

7. The method of claim 1, wherein, for a given communications device having a single radio interface for communicating with the WLAN, exchanging control data with the communications device includes sending control signaling that controls multiplexing of the single radio interface by the communications device for alternating between communicating with the first AP for exchanging control data and communicating with one or more second APs for exchanging traffic data.

8. A method of operating a Wireless Local Access Network (WLAN) comprising:
    operating a first Access Point (AP) as an anchor node within an overall coverage area of the WLAN, including providing one or more first frequency channels via the first AP having a coverage range extending over the overall coverage area;
    operating a plurality of second APs as respective traffic nodes within the overall coverage area of the WLAN, including providing one or more second frequency channels via each second AP having a coverage range extending over a corresponding second coverage area subsumed in the overall coverage area; and
    exchanging control data with all communications devices operating in the WLAN via the first AP, the control data effecting network management control of the communications devices with respect to the WLAN, and selectively exchanging traffic data with individual ones of the communications devices via respective ones of the second APs;
wherein selectively exchanging traffic data with individual ones of the communications devices comprises, for any given communications device that is connected to the first AP but not connected to any of the second APs:
exchanging the traffic data with the given communications device via the first AP, when a limiting parameter for exchanging traffic data via the first AP is not exceeded; and
exchanging the traffic data with the given communications device via one or more of the second APs, when the limiting parameter for exchanging traffic data via the first AP is exceeded;
wherein the limiting parameter is any one or more of: a monitored rate of packets dropped when exchanging the traffic data with the given communications device via the first AP, a data amount threshold that limits the amount of data that can be exchanged at any one time via the first AP, a data rate threshold that limits the data rate permissible or achievable when exchanging traffic data via the first AP, and a Quality-of-Service (QoS) parameter that limits a QoS achievable when exchanging traffic data via the first AP.

9. A method of operating a Wireless Local Access Network (WLAN) comprising:
operating a first Access Point (AP) as an anchor node within an overall coverage area of the WLAN, including providing one or more first frequency channels via the first AP having a coverage range extending over the overall coverage area;
operating a plurality of second APs as respective traffic nodes within the overall coverage area of the WLAN, including providing one or more second frequency channels via each second AP having a coverage range extending over a corresponding second coverage area subsumed in the overall coverage area; and
exchanging control data with all communications devices operating in the WLAN via the first AP, the control data effecting network management control of the communications devices with respect to the WLAN, and selectively exchanging traffic data with individual ones of the communications devices via respective ones of the second APs;
wherein exchanging control data with all communications devices operating in the WLAN via the first AP comprises establishing and maintaining a control channel connection at the first AP for each communications device operating in the WLAN irrespective of mobility of the communications device between or among the second coverage areas, and establishing and maintaining traffic channel connections for the communications device at respective ones of the second APs, under control of the first AP, and in dependence on mobility of the communications device between or among the second coverage areas.

10. A method of operating a communications device in a Wireless Local Area Network (WLAN) comprising:
connecting to a first Access Point (AP) of the WLAN, the first AP operating as an anchor node within an overall coverage area of the WLAN and providing one or more first frequency channels having a coverage range extending over the overall coverage area;
exchanging control data with the first AP via the one or more first frequency channels, the control data effecting network management control of the communications device with respect to the WLAN; and
while connected to the first AP and in response to control data from the first AP:
connecting to a respective second AP among a plurality of second APs of the WLAN, the second APs operating as traffic nodes within the overall coverage area of the WLAN and each providing one or more second frequency channels having a coverage range extending over a corresponding second coverage area subsumed in the overall coverage area; and
exchanging traffic data with the respective second AP via the one or more second frequency channels provided by the respective second AP;
wherein the method further comprises receiving first control data from the first AP indicating whether the communications device should use the same Medium Access Control (MAC) identifier (ID) when communicating with the first AP and the second APs, or should use a different MAC ID for communicating with the first AP as compared to the second APs, and using the same or different MAC IDs for communicating with the first AP and any one or more of the second APs, in dependence on the first control data.

11. The method of claim 10, wherein exchanging control data with the first AP includes receiving control data from the first AP directing the communications device to connect to the respective second AP, and wherein connecting to the respective second AP comprises initiating a connection to the respective second AP in response to the received control data.

12. The method of claim 10, wherein exchanging control data with the first AP includes receiving first control data from the first AP identifying one or more frequency bands to be used for connecting to one or more of the second APs.

13. The method of claim 10, wherein exchanging control data with the first AP includes exchanging handover control signaling, controlling handover of the communications device between or among respective ones of the second APs, and connecting to or disconnecting from the respective ones of the second APs responsive to the handover control signaling.

14. The method of claim 10, wherein the communications device has a single radio interface for communicating with the WLAN, and wherein exchanging control data with the first AP includes receiving control signaling that controls multiplexing of the single radio interface by the communications device for alternating between communicating with the first AP for exchanging control data and communicating with one or more second APs for exchanging traffic data.

15. A method of operating a communications device in a Wireless Local Area Network (WLAN) comprising:
connecting to a first Access Point (AP) of the WLAN, the first AP operating as an anchor node within an overall coverage area of the WLAN and providing one or more first frequency channels having a coverage range extending over the overall coverage area;
exchanging control data with the first AP via the one or more first frequency channels, the control data effecting network management control of the communications device with respect to the WLAN; and
while connected to the first AP and in response to control data from the first AP:
connecting to a respective second AP among a plurality of second APs of the WLAN, the second APs operating as traffic nodes within the overall coverage area of the WLAN and each providing one or more second frequency channels having a coverage range extending over a corresponding second coverage area subsumed in the overall coverage area; and exchanging traffic data with the respective second AP via the one or more second frequency channels provided by the respective second AP;

wherein, at least when connected to the first AP but not connected to any second AP, exchanging control data with the first AP includes indicating to the first AP an amount of traffic data buffered at the communications device for transmission and receiving return signaling indicating whether to send the traffic data to the first AP or to connect to one of the second APs for sending the traffic data.

16. A Wireless Local Access Network (WLAN) comprising:

a first Access Point (AP) configured to operate as an anchor node within an overall coverage area of the WLAN, based on providing one or more first frequency channels via the first AP having a coverage range extending over the overall coverage area; and a plurality of second APs configured to operate under control of the first AP as respective traffic nodes within the overall coverage area of the WLAN, based on providing one or more second frequency channels via each second AP having a coverage range extending over a corresponding second coverage area subsumed in the overall coverage area;

wherein the first AP is configured for exchanging control data with all communications devices operating in the WLAN, the control data effecting network management control of the communications devices with respect to the WLAN, and wherein the second APs are configured for selectively exchanging traffic data with individual ones of the communications devices;

wherein the first AP and the plurality of second APs communicatively couple to a backhaul network, and wherein the traffic data being exchanged with any given communications device flows through the second AP or the second APs currently being used for exchanging the traffic data with the given communications device without passing through the first AP, and wherein the WLAN is configured to use a first Medium Access Control (MAC) identifier (ID) for the given communications device at the first AP, and use one or more second MAC IDs for the given communications device at the second AP or the second APs currently being used for exchanging the traffic data with the given communications device.

17. A communications device configured for operation in a Wireless Local Area Network (WLAN) and comprising:

one or more radio interfaces configured for communicatively coupling the communications device to the WLAN; and processing circuitry configured to control the communications device to:

connect to a first Access Point (AP) of the WLAN, the first AP operating as an anchor node within an overall coverage area of the WLAN and providing one or more first frequency channels having a coverage range extending over the overall coverage area, and exchange control data with the first AP via the one or more first frequency channels, the control data effecting network management control of the communications device with respect to the WLAN; and while connected to the first AP and in response to control data from the first AP:

connect to a respective second AP among a plurality of second APs of the WLAN, the second APs operating as traffic nodes within the overall coverage area of the WLAN and each providing one or more second frequency channels having a coverage range extending over a corresponding second coverage area subsumed in the overall coverage area, and exchange traffic data with the respective second AP via the one or more second frequency channels provided by the respective second AP;

wherein the processing circuitry is further configured to receive first control data from the first AP indicating whether the communications device should use the same Medium Access Control (MAC) identifier (ID) when communicating with the first AP and the second APs, or should use a different MAC ID for communicating with the first AP as compared to the second APs, and use the same or different MAC IDs for communicating with the first AP and any one or more of the second APs, in dependence on the first control data.

* * * * *